(12) United States Patent
Plotkin et al.

(10) Patent No.: US 10,657,211 B2
(45) Date of Patent: May 19, 2020

(54) CIRCUIT GENERATION BASED ON ZERO WIRE LOAD ASSERTIONS

(71) Applicant: INTERNATIONAL BUSINESS MACHINES CORPORATION, Armonk, NY (US)

(72) Inventors: Limor Plotkin, Even Yehuda (IL); Shiran Raz, Ganey Tikva (IL); Yaniv Maroz, Kiryat Uno (IL); Ofer Geva, Ramat HaSaron (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 15/957,959

(22) Filed: Apr. 20, 2018

(65) Prior Publication Data
US 2019/0325102 A1    Oct. 24, 2019

(51) Int. Cl.
*G06F 17/50* (2006.01)

(52) U.S. Cl.
CPC ........ *G06F 17/5045* (2013.01); *G06F 17/505* (2013.01); *G06F 2217/02* (2013.01); *G06F 2217/04* (2013.01)

(58) Field of Classification Search
CPC ............... G06F 17/5045; G06F 17/505; G06F 2217/02; G06F 2217/04
USPC ........................................................ 716/102
See application file for complete search history.

(56) References Cited

U.S. PATENT DOCUMENTS

| | | | |
|---|---|---|---|
| 6,185,723 B1* | 2/2001 | Burks | G06F 17/5031 703/14 |
| 8,813,007 B2 | 8/2014 | Dsouza | |
| 9,032,347 B1 | 5/2015 | O'Riordan | |
| 9,058,456 B2 | 6/2015 | Haller et al. | |
| 9,342,639 B1 | 5/2016 | Casey et al. | |
| 2013/0326450 A1* | 12/2013 | Alpert | G06F 17/505 716/114 |
| 2016/0292330 A1 | 10/2016 | Theivendran et al. | |
| 2017/0124236 A1* | 5/2017 | Srimal | G06F 17/504 |

OTHER PUBLICATIONS

Ribon, Aurelien et al., "Assertion Support in High-Level Synthesis Design Flow," 2011 Forum on Specification and Design Languages, Sep. 2011, pp. 1-9.

Pierre, L. et al., "On The Effectiveness of Assertion-Based Verification in an Industrial Context," FMICS 2013 Proceedings of the 18th International Workshop on Formal Methods for Industrial Critical Systems—vol. 8187, Sep. 2013, pp. 1-17.

(Continued)

*Primary Examiner* — Jack Chiang
*Assistant Examiner* — Brandon Bowers
(74) *Attorney, Agent, or Firm* — Margaret A. McNamara, Esq.; Kevin P. Radigan, Esq.; Heslin Rothenberg Farley & Mesiti P.C.

(57) ABSTRACT

Zero wire load based assertions are generated. A zero wire load report is generated for a set of logic in a hardware description language corresponding to a circuit design. A set of assertions is identified for the circuit design by parsing the zero wire load report based in part on real data values corresponding to best case delays for one or more input pins and one or more output pins in a plurality of macros of the circuit design. A circuit may be fabricated based on the set of assertions.

20 Claims, 6 Drawing Sheets

(56) References Cited

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

* cited by examiner

CIRCUIT GENERATION BASED ON ZERO WIRE LOAD ASSERTIONS

BACKGROUND

One or more aspects of the present disclosure relate to generating circuits, and more specifically, but not exclusively, to generating circuits based on zero wire load assertions.

SUMMARY

Shortcomings of the prior art are overcome and additional advantages are provided through the provision of a system for generating zero wire load based assertions. The system includes a processor configured to perform a method. The method includes generating a zero wire load report for a set of logic in a hardware description language corresponding to a circuit design. A set of assertions for the circuit design is identified by parsing the zero wire load report based in part on real data values corresponding to best case delays for one or more input pins and one or more output pins in a plurality of macros of the circuit design. Fabrication of a circuit based on the set of assertions is initiated.

Computer-implemented methods and computer program products relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Very High Speed Integrated Circuit Hardware Description Language (VHDL) code can be used in electronic design automation to describe digital and mixed-signal systems, such as integrated circuits, among others. In some examples, VHDL code can describe logic circuits and can be synthesized by constructing a gate level netlist that is compiled and mapped into an implementation technology, such as an FPGA (field-programmable gate array) or ASIC (application-specific integrated circuit). In some examples, VHDL code can be event-driven, wherein each transaction can be added to an event queue for a scheduled time. In some examples, a zero delay time is supported by VHDL code based on an infinitely small delta delay. The VHDL code can include any suitable number of input ports and output ports for any number of gates. In some examples, an electrical load can be designated for each input port or output port. The electrical load can indicate any device or logic gate connected to a signal source regardless of whether the device or logic gate consumes power.

In one or more embodiments described herein, a device can generate zero wire load based assertions. An assertion, as referred to herein, can include any suitable statement in VHDL that determines a Boolean condition. An assertion can be used for an internal consistency check for conditions within a gate of a circuit design or an assertion can be used to generate an error when a condition within a gate of a circuit design fails to comply with predetermined operating conditions. In some examples, predefined severity names associated with an assertion can include a note, warning, error, and failure. In some examples, a device can generate a zero wire load report for a set of logic in a hardware description language corresponding to a circuit design. The device can also identify a set of assertions for the circuit design by parsing the zero wire load report based in part on real data values corresponding to best case delays for each input pin and each output pin in a plurality of macros of the circuit design. Furthermore, the device can synthesize the circuit design and fabricate a circuit based on the set of assertions.

Accordingly, the techniques described herein can reduce an amount of time to synthesize a stable circuit design and fabricate a circuit. Additionally, the techniques described herein may not rely upon a set of manual entries that define the number of technology independent logic levels. Furthermore, the techniques described herein can enable synthesizing VHDL code faster based on lower bound values rather than unrealistic assertions based on physical design elements.

Figure 1:
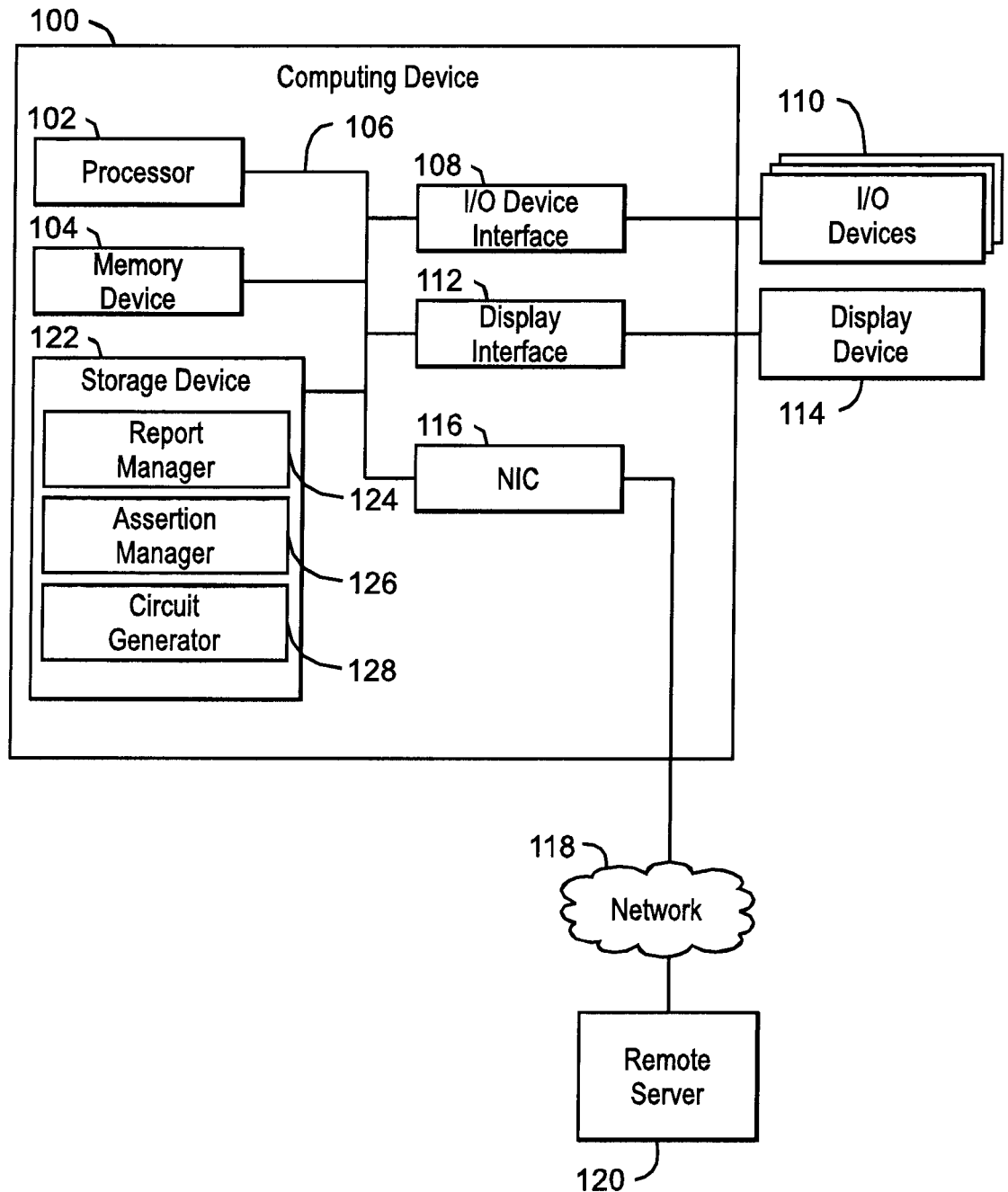
FIG. 1 depicts a block diagram of an example computing system that can generate zero wire load based assertions according to an embodiment described herein.

With reference now to FIG. 1, an example computing device is depicted that can generate zero wire load based assertions. The computing device 100 may be, for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote server 120 may connect to the computing device 100 through the network 118.

The processor 102 may also be linked through the system interconnect 106 to a storage device 122 that can include a hard drive, an optical drive, a USB flash drive, an array of drives, or any combinations thereof. In some examples, the storage device 122 may include a report manager 124, an assertion manager 126, and a circuit generator 128. In some embodiments, the report manager 124 can generate a zero wire load report for a set of logic in a hardware description language corresponding to a circuit design. In some embodiments, an assertion manager 126 can identify a set of assertions for the circuit design by parsing the zero wire load report based in part on real data values corresponding to best case delays for each input pin and each output pin in a plurality of macros of the circuit design. In some embodiments, a circuit generator 128 can fabricate a circuit based on the set of assertions.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of report manager 124, assertion manager 126, and circuit generator 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the report manager 124, assertion manager 126, and circuit generator 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
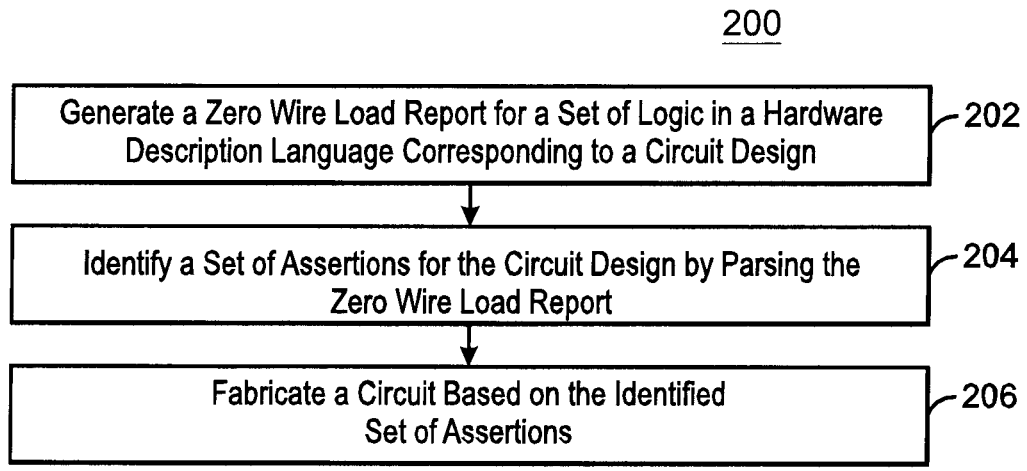
FIG. 2 is one example of a process flow diagram for generating zero wire load based assertions according to an embodiment described herein.

FIG. 2 is one example of a process flow diagram of an example method that can generate zero wire load based assertions according to an embodiment described herein. The method 200 can be implemented with any suitable computing device, such as the computing device 100 of FIG. 1.

At block 202, a report manager 124 can generate a zero wire load report for a set of logic in a hardware description language corresponding to a circuit design. The zero wire load report can indicate a timing report for a logic description of a physical design for macros, gates, and routing of a circuit design. The zero wire load can also indicate logic only delays between macros, gates, and routing of the circuit design. In some examples, the zero wire load report can indicate a length of a device, a standard gate delay, a fanout based on a load that a gate is driving, and the like. For example, the zero wire load report can indicate a fanout corresponding to a logic gate driving two NAND gates.

At block 204, an assertion manager 126 can identify a set of assertions for the circuit design by parsing the zero wire load report based in part on real data values corresponding to best case delays for each input pin and each output pin in a plurality of macros of the circuit design. The real data values can correspond to actual delays corresponding to logic in a circuit according to VHDL simulations. For example, real data values can indicate delays in processing logic by an AND gate, OR gate, NAND gate, XOR gate, or any other suitable gate. In some embodiments, the identified set of assertions can include a delay and a slack for the input pins or the output pins in each of the plurality of macros. In some embodiments, the identified set of assertions can include an estimated time of arrival (ETA) value indicating a delay for an output pin in the circuit design. The ETA value can indicate a time required for a signal to arrive at an output pin. In some examples, tight assertions can be prioritized above ETA values, while relaxed assertions can have a wider range of ETA values. In some embodiments, the identified set of assertions can include a pin in standard (PIS) value indicating a combination of delay and slack for at least one input pin in the circuit design. In some embodiments, the identified set of assertions can include a pin out standard (POS) value indicating a load for each of the output pins in the circuit design. The identified set of assertions may be based on the actual design of a circuit. Therefore, the identified set of assertions may not be based on default values that are constant for a design and not based on the actual design of a circuit.

At block 206, a circuit generator 128 can fabricate a circuit based on the identified set of assertions. In some embodiments, the circuit can be fabricated with any suitable three dimensional printing technique or any suitable integrated circuit manufacturing technique. In some examples, the circuit is fabricated based on a synthesized circuit resulting from the identified set of assertions.

The process flow diagram of FIG. 2 is not intended to indicate that the operations of the method 200 are to be executed in any particular order, or that all of the operations of the method 200 are to be included in every case.

Figure 3:
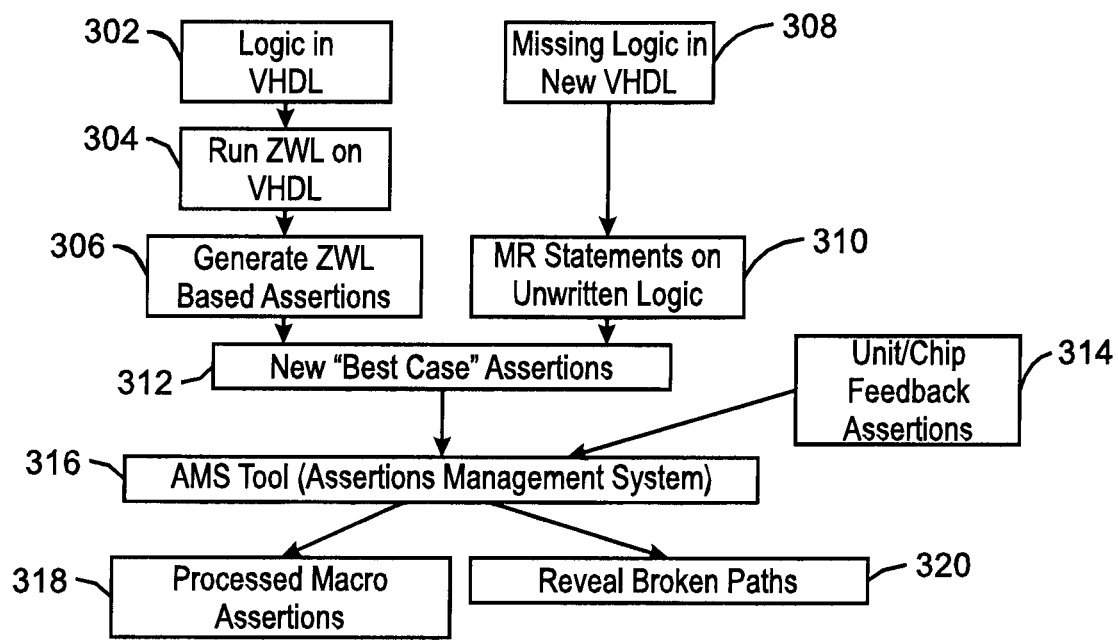
FIG. 3 is one example of a process flow diagram of an example method that can generate zero wire load based assertions according to an embodiment described herein.

FIG. 3 is one example of a process flow diagram of an example method that can generate zero wire load based assertions according to an embodiment described herein. The method 300 can be implemented with any suitable computing device, such as the computing device 100 of FIG. 1.

At block 302, the method 300 can include detecting logic in a very high speed integrated circuit hardware description language (VHDL). The VHDL can include behavioral or structural representations of various logic gates and integrated circuits. In some examples, the behavioral representation of logic gates and integrated circuits can indicate arithmetic operations to be executed and dataflow paths for signals within logic gates and integrated circuits. In some embodiments, the structural representation can indicate interconnections between various components and logic gates. In some examples, an integrated circuit can be designed using a hierarchical model within a VHDL entity. The VHDL entity can include an interface accessed by any suitable number of ports and a body or architecture that includes a description of the VHDL entity such as interconnected entities, processes, and components. In some embodiments, the components of the VHDL entity can operate concurrently or sequentially. In some embodiments, each port can correspond to an input signal, an output signal that transmits a value that may not be accessible or read by the VHDL entity's architecture, a buffer signal that can be read by components within a VHDL entity's architecture, or an in-out signal that can be an input signal or an output signal. In some examples, a value transmitted by a port can be a Boolean bit value, a zero or one bit value, a bit vector including a vector of bit values, an abstract data type with any suitable number of bit values indicating a value and strength of a signal, an integer value, a real value, a character value, or a time value.

At block 304, the method 300 can include executing a zero wire load (ZWL) tool with the logic in VHDL. In some embodiments, the zero wire load tool can generate a zero wire load timing report that can identify delays associated with various logic components in a circuit. For example, the zero wire load tool can identify standard gate delays, a fanout corresponding to a load that a gate is driving, and a length of a device, among others.

At block 306, the method 300 can include generating a zero wire load based assertion. A zero wire load based assertion, as referred to herein, can include any suitable Boolean condition corresponding to a gate in a circuit design. In some examples, the Boolean condition includes a logic delay in processing a signal by a gate, but the Boolean condition may not include a delay based on a load of a gate, or a delay based on a wire transmitting a signal. In some examples, the zero wire load based assertions are calculated from the zero wire load timing report. Each zero wire load based assertion can correspond to a delay for an input pin or output pin. For example, a zero wire load based assertion for an input pin can be an arrival time of a signal at the input pin in additional to slack. In some embodiments, the zero wire load based assertion can indicate a delay between a latch and an output pin, a delay between an input pin and a latch, or a delay between an input pin and an output pin. In some embodiments, the zero wire load based assertion for an output pin can include an arrival time of a signal at an output pin.

At block 308, the method 300 can include identifying missing logic in new VHDL. In some embodiments, portions of a circuit may not be described in any suitable programming language. For example, the missing logic can include logic behavior that has not been written in VHDL. At block 310, the method 300 can include generating MR (make registers) statements with the missing unwritten logic. The make registers (MR) statements, as referred to herein, can indicate a delay associated with logic gates that can implement the missing logic. In some examples, the MR statements can include any suitable pico-second value indicating a delay in processing a signal by gates corresponding to the missing logic.

At block 312, the method 300 can include identifying best case assertions based in part on the zero wire load based assertions or the MR statements. As discussed above, the best case assertions can be identified using real data values corresponding to actual delays for logic gates in a circuit. For example, real data values can indicate delays in processing logic in VHDL code by an AND gate, OR gate, NAND gate, XOR gate, XNOR gate, or any other suitable gate. In some embodiments, the identified best case assertions can include a delay and a slack for the input pins or the output pins in each of a plurality of macros of a circuit design. A macro, as referred to herein, can include any suitable soft macros, such as a semiconductor core that includes a reusable unit, logic cell, or integrated circuit layout design. In some embodiments, the macro can be synthesizable register-transfer level design abstractions indicating a flow of signals between hardware registers and logical operations performed with the signals. The macros can also include hard macros or hard cores that include analog and mixed-signal logic defined at a physical description level in transistor layout formats.

In some embodiments, the identified best case assertions can include an ETA value indicating a delay for an output pin in the circuit design. In some embodiments, the identified set of assertions can include a PIS value indicating a combination of delay and slack for at least one input pin or at least one output pin in the circuit design. In some embodiments, the identified set of assertions can include a POS value indicating a load for each of the output pins in the circuit design. In some embodiments, the method 300 can identify best case assertions based on delays corresponding to MR statements if the logic has not yet been written in VHDL.

At block 314, the method 300 can include identifying unit or chip feedback assertions. In some examples, unit or chip feedback assertions can be included in an output file generated from running timing on a circuit or chip. In some embodiments, the output file can include lists of all the pins of the units or macros in the circuit or chip and the assertions for each pin. In some examples, the macros, units, and chip are organized in a hierarchical technique so that a chip includes multiple units and a unit includes multiple macros.

At block 316, the method 300 can include executing an assertions management system (AMS) based in part on the unit or chip feedback assertions in combination with the best case assertions. In some embodiments, the AMS tool can be code that is executed with a timing run for a circuit. The AMS tool can control the assertions and generate the unit and chip feedback assertions at the end of the timing run. In some examples, the method 300 can use out-of-context values to determine assertions or delays for a macro based on best case assertions. The out-of-context values can include real timing values for any number of macros. In some examples, the method 300 can also include using in-context values to determine unit or chip feedback assertions based on best case assertions from multiple macros.

At block 318, the method 300 can include identifying processed macro assertions. In some embodiments, a macro assertions file can include a list of all pins of a macro. In some examples, for each pin, the macro assertions list can indicate a phase name, an estimated time of arrival for a late mode and an estimated time of arrival for an early mode. In some examples, the late mode and the early mode can each include a low estimated time of arrival and a high estimated time of arrival. The estimated time of arrivals for the late mode and early mode can provide a range in which logic can operate without a broken path.

In some embodiments, for each output pin, macro assertions can indicate a nominal rise, nominal fall, early rise, and early fall. The nominal rise, nominal fall, early rise, and early fall values can indicate various operating characteristics of an output pin. In some examples, an output pin can operate faster with a higher temperature or a low interference or noise. An output pin may operate slower in an environment with a lower temperature or with high interference.

In some embodiments, for each input pin, the macro assertions can indicate a nominal rise, nominal fall, slew rise, and slew fall. These values can indicate a strength of a signal. In some examples, the slew rise values and slew fall values can indicate a noise level, which can change a polarity of a signal and break the logic. The slew rise and slew fall values can indicate when a signal is rising or falling at an input pin. In some examples, each input pin and output pin can also correspond to a phase such as an abist phase, scan phase, or multiple of a cycle time. In some embodiments, the abist phase can be a value below a predetermined cycle time such as five picoseconds. In some examples, the multiple of the cycle time can be any suitable integer, such as four, among other values.

At block 320, the method 300 can include identifying and revealing broken paths. In some embodiments, the broken paths can include paths in a circuit that have a delay outside of a predetermined range. For example, a broken path may transmit a signal too slowly or too fast. In some embodiments, a broken path is identified if a best case assertion is smaller than a unit or circuit feedback assertion. In some embodiments, a broken path can be identified based on a delay or assertion time between two latches exceeding a predetermined value.

The process flow diagram of FIG. 3 is not intended to indicate that the operations of the method 300 are to be executed in any particular order, or that all of the operations of the method 300 are to be included in every case. In some embodiments, the processed macro assertions can be used to synthesize a circuit design prior to fabricating the circuit. In some examples, the method 300 can include parsing the zero wire load report based on unwritten logic. In some embodiments, the method 300 can include identifying at least one broken path based on the identified set of assertions if the at least one broken path exists.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
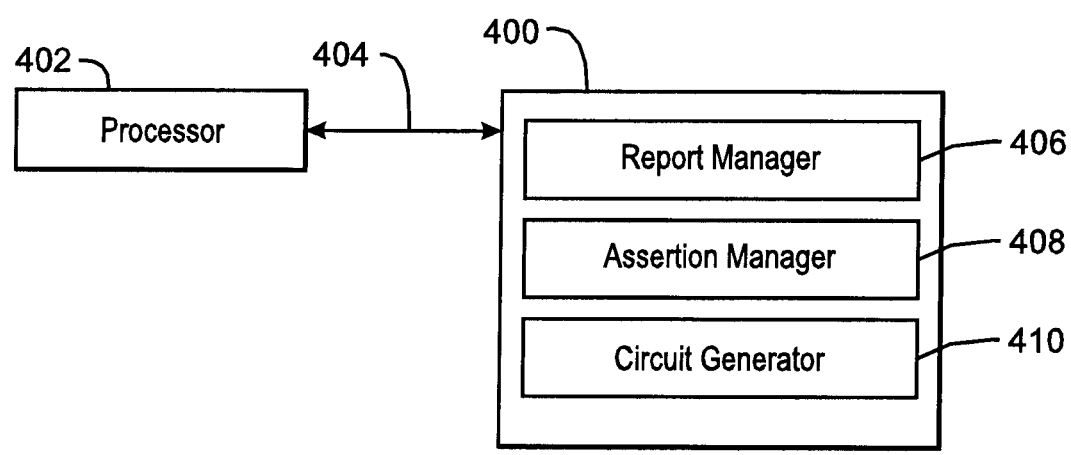
FIG. 4 is one example of a tangible, non-transitory computer-readable medium that can generate zero wire load based assertions according to an embodiment described herein.

Referring now to FIG. 4, a block diagram is depicted of an example of a tangible, non-transitory computer-readable medium that can generate a zero wire load assertion. The tangible, non-transitory, computer-readable medium 400 may be accessed by a processor 402 over a computer interconnect 404.

Furthermore, the tangible, non-transitory, computer-readable medium 400 may include code to direct the processor 402 to perform operations of the current method. For example, a report manager 406 can generate a zero wire load report for a set of logic in a hardware description language corresponding to a circuit design. In some embodiments, an assertion manager 408 can identify a set of assertions for the circuit design by parsing the zero wire load report based in part on real data values corresponding to best case delays for each input pin and each output pin in a plurality of macros of the circuit design. Additionally, in some embodiments, a circuit generator 410 can fabricate a circuit based on the set of assertions.

It is to be understood that any number of additional software components not shown in FIG. 4 may be included within the tangible, non-transitory, computer-readable medium 400, depending on the specific application.

As described herein, according to an embodiment, a system for generating zero wire load based assertions can include a processor to generate a zero wire load report for a set of logic in a hardware description language corresponding to a circuit design. The processor can also identify a set of assertions for the circuit design by parsing the zero wire load report based in part on real data values corresponding to best case delays for each input pin and each output pin in a plurality of macros of the circuit design. Furthermore, the processor can fabricate a circuit based on the set of assertions.

According to another embodiment, a method for generating zero wire load based assertions can include generating, via a processor, a zero wire load report for a set of logic in a hardware description language corresponding to a circuit design. The method can also include identifying, via the processor, a set of assertions for the circuit design by parsing the zero wire load report based in part on real data values corresponding to best case delays for each input pin and each output pin in a plurality of macros of the circuit design. Furthermore, the method can include fabricating a circuit based on the set of assertions.

According to yet another embodiment, a computer program product for generating zero wire load based assertions can include a computer readable storage medium having program instructions embodied therewith, wherein the computer readable storage medium is not a transitory signal per se. The program instructions can be executable by a processor to cause the processor to generate a zero wire load report for a set of logic in a hardware description language corresponding to a circuit design. The program instructions can also cause the processor to identify a set of assertions for the circuit design by parsing the zero wire load report based in part on real data values corresponding to best case delays for each input pin and each output pin in a plurality of macros of the circuit design. Furthermore, the program instructions can cause the processor to fabricate a circuit based on the set of assertions.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 5:
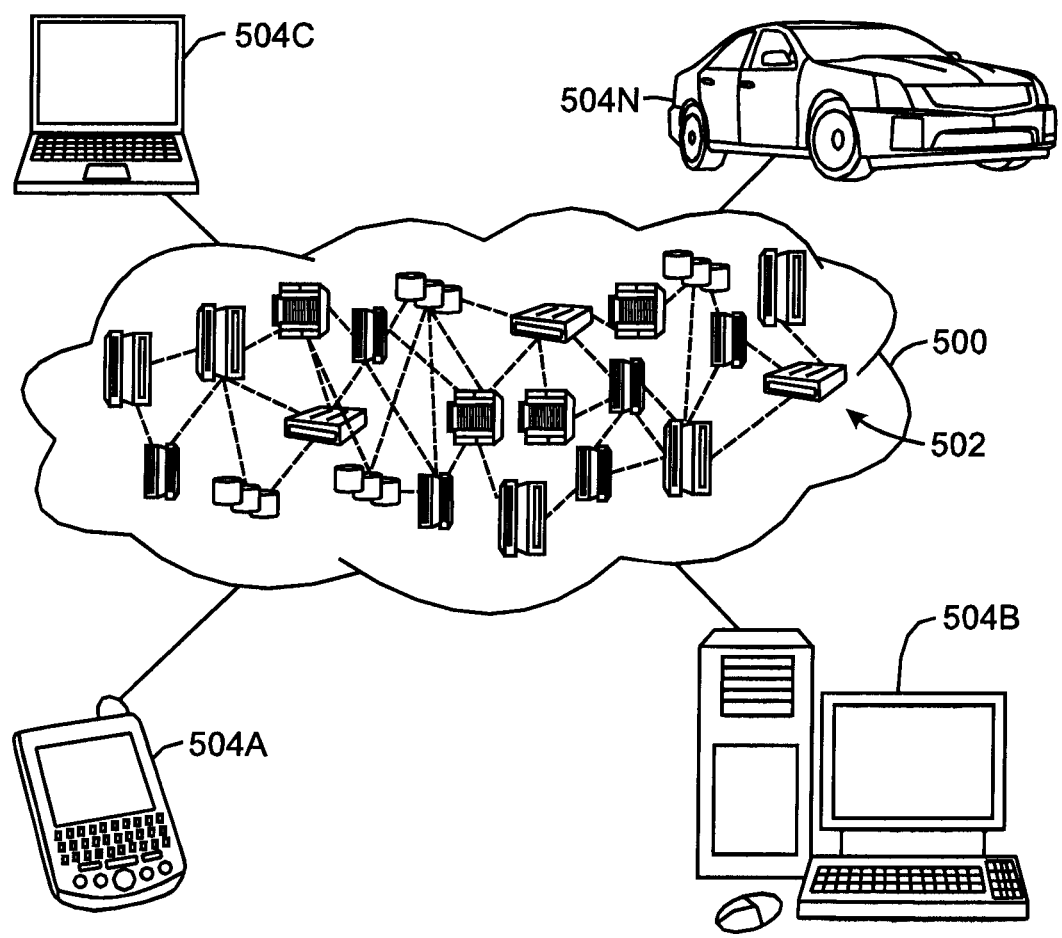
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
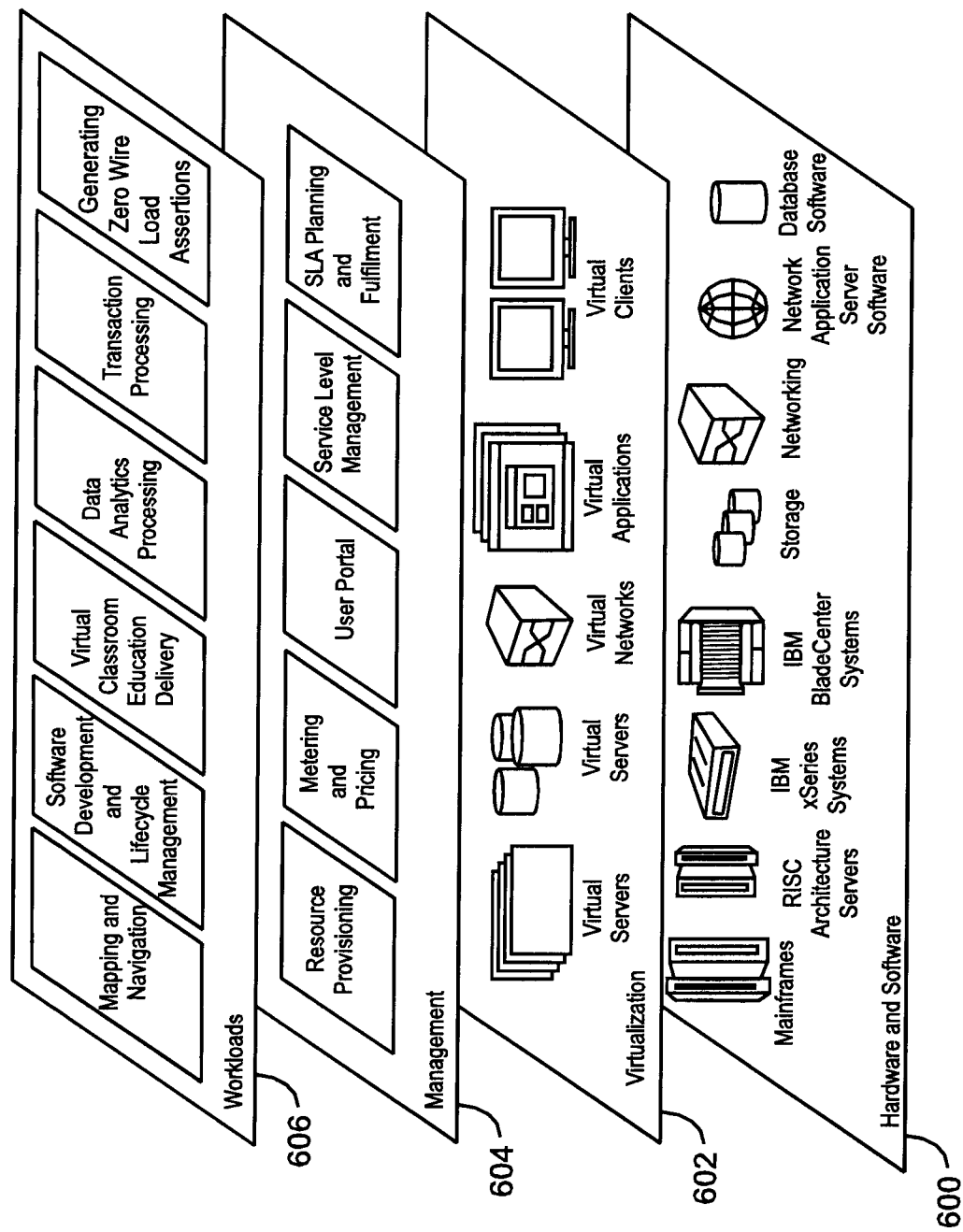
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include mainframes; RISC (Reduced Instruction Set Computer) architecture based servers; servers; blade servers; storage devices; and networks and networking components. In some embodiments, software components include network application server software and database software.

Virtualization layer 602 provides an abstraction layer from which the following examples of virtual entities may be provided: virtual servers; virtual storage; virtual networks, including virtual private networks; virtual applications and operating systems; and virtual clients.

In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and generating zero wire load assertions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating zero wire load based assertions comprising:
    a processor configured to perform a method, the method comprising:
        generating, via a zero wire load tool, a zero wire load report for a set of logic in a hardware description language corresponding to a circuit design;
        identifying a set of zero-wire-load-based assertions for the circuit design by parsing the zero wire load report based in part on real data values corresponding to best case delays for one or more input pins and one or more output pins in a plurality of macros of the circuit design, the real data values being actual delay values according to a hardware description language simulation, and an assertion of the set of zero-wire-load-based assertions including a statement in the hardware description language that determines a Boolean condition; and
        initiating fabrication of a circuit based on the set of zero-wire-load-based assertions.

2. The system of claim 1, wherein the method further comprises parsing the zero wire load report based on unwritten logic.

3. The system of claim 1, wherein the method further comprises identifying, based on at least one broken path existing, at least one broken path based on the set of zero-wire-load-based assertions, the at least one broken path being identified where an associated best case assertion of the set of zero-wire-load-based assertions is smaller than a circuit feedback assertion.

4. The system of claim 1, wherein the set of zero-wire-load-based assertions comprises a delay and a slack for the one or more input pins or the one or more output pins in each macro of the plurality of macros.

5. The system of claim 1, wherein the set of zero-wire-load-based assertions comprises an estimated time of arrival value indicating a delay for an output pin in the circuit design.

6. The system of claim 1, wherein the set of zero-wire-load-based assertions comprise a pin in standard value indicating a combination of delay and slack for at least one input pin or at least one output pin in the circuit design.

7. The system of claim 1, wherein the set of zero-wire-load-based assertions comprises a pin out standard value indicating a load for one or more of the output pins in the circuit design.

8. The system of claim 1, wherein the zero wire load report comprises one of the following selected from the group consisting of: a standard gate delay, a fanout value, and a length of a device in the circuit design.

9. A method of generating zero wire load based assertions comprising:
    generating, via a processor executing a zero wire load tool, a zero wire load report for a set of logic in a hardware description language corresponding to a circuit design;
    identifying, via the processor, a set of zero-wire-load-based assertions for the circuit design by parsing the zero wire load report based in part on real data values corresponding to best case delays for one or more input pins and one or more output pins in a plurality of macros of the circuit design, the real data values being actual delay values according to a hardware description language simulation, and an assertion of the set of zero-wire-load-based assertions including a statement in the hardware description language that determines a Boolean condition; and
    initiating fabrication of a circuit based on the set of zero-wire-load-based assertions.

10. The method of claim 9, further comprising parsing the zero wire load report based on unwritten logic.

11. The method of claim 9, further comprising identifying, based on at least one broken path existing, at least one broken path based on the set of zero-wire-load-based assertions, the at least one broken path being identified where an associated best case assertion of the set of zero-wire-load-based assertions is smaller than a circuit feedback assertion.

12. The method of claim 9, wherein the set of zero-wire-load-based assertions comprise a delay and a slack for the one or more input pins or the one or more output pins in each macro of the plurality of macros.

13. The method of claim 9, wherein the set of zero-wire-load-based assertions comprises an estimated time of arrival value indicating a delay for an output pin in the circuit design.

14. The method of claim 9, wherein the set of zero-wire-load-based assertions comprises a pin in standard value indicating a combination of delay and slack for at least one input pin or at least one output pin in the circuit design.

15. The method of claim 9, wherein the set of zero-wire-load-based assertions comprises a pin out standard value indicating a load for one or more of the output pins in the circuit design.

16. The method of claim 9, wherein the zero wire load report comprises one of the following selected from the group consisting of: a standard gate delay, a fanout value, and a length of a device in the circuit design.

17. A computer program product for generating zero wire load based assertions, the computer program product comprising:
    a computer readable storage medium readable by a processing circuit and storing instructions for performing a method comprising:
        generating, via a zero wire load tool, a zero wire load report for a set of logic in a hardware description language corresponding to a circuit design;
        identifying a set of zero-wire-load-based assertions for the circuit design by parsing the zero wire load report based in part on real data values corresponding to best case delays for one or more input pins and one or more output pins in a plurality of macros of the circuit design, the real data values being actual delay values according to a hardware description language simulation, and an assertion of the set of zero-wire-load-based assertions including a statement in the hardware description language that determines a Boolean condition; and initiating fabrication of a circuit based on the set of zero-wire-load-based assertions.

18. The computer program product of claim 17, wherein the method further comprises parsing the zero wire load report based on unwritten logic.

19. The computer program product of claim 17, wherein the method further comprises identifying, based on at least one broken path existing, at least one broken path based on the set of zero-wire-load-based assertions, the at least one broken path being identified where an associated best case assertion of the set of zero-wire-load-based assertions is smaller than a circuit feedback assertion.

20. The computer program product of claim 17, wherein the set of zero-wire-load-based assertions comprises a delay and a slack for the one or more input pins or the one or more output pins in each macro of the plurality of macros.

* * * * *